Patented July 30, 1940

2,209,571

UNITED STATES PATENT OFFICE 2,209,571

WALL SEALING

William F. Leicester, New York, N. Y.

No Drawing. Application January 3, 1938,
Serial No. 183,227

13 Claims. (Cl. 134—50)

This invention relates to a new and useful composition for use as a sealing material and especially for the sealing of plaster and other porous walls prior to painting or otherwise coating or decorating same.

It is well known in painting and decorating that surfaces such as plaster and wall-board and even some types of wood, require a first sealing coat which will spread evenly on the surface to be coated and will not run or flow down the surface while drying and will fill the pores of the surface to which it has been applied, sufficiently, to permit the subsequent application of one or more coats of paint (oil paint, distemper paint, lacquer, etc.) or other coating composition, and which will allow the paint, etc., when applied, to be spread freely and evenly without showing laps, brush marks, etc. Another important function is to prevent lime, etc. from the plaster from being drawn into the paint, to injure the latter either when freshly applied or later. The sealing composition after it has been applied to the surface and after drying, must show good adhesion with no tendency to crack or peel, even after subsequent coats of paint have been applied. Furthermore, the applied sealer must not possess the property of causing delicate paint to fade or change color, during or after application.

I have found that dried milk is very effective for this purpose. I may use either dried skim milk or dried whole milk, (that is, the product made by drying milk containing little or no butter fat, or containing the full amount of butter fat originally contained in the milk), but thus far my experiments have not demonstrated any advantage in the use of the dried whole milk containing the fat, and of course skim milk is a much cheaper raw material. The results of many tests I have made, indicate that any kind of dried milk powder is satisfactory, although I prefer the product made on a drum drier, i. e. the so-called "roller process" powder in preference to the spray dried milk powder, for the reason that there is less tendency toward lumping with the roller process type than with the spray dried milk powder type, when mixing the dry sealer with water, to produce the liquid sealer. I have found that a very satisfactory sealer for priming walls and other surfaces can be prepared as follows:

Example 1 (*Plain dried milk powder*).—Into a proper mixing container, place ½ gallon (approximately 4 lbs.) cold or warm water. Then add 1 lb. of dry skim milk powder. Mix to a smooth paste and allow to stand for about 15 minutes. Then add with stirring, another gallon of water, cold or warm, thus obtaining a mixture of approximately 12 lbs. of water to 1 lb. of dry milk powder. The material is now ready to be applied as a sealer to plastered surfaces, fiber-board, and the like.

However, I find that better results are obtained by using a small amount of a solubilizing agent with the dried milk. When I refer to a solubilizing agent, for the purpose of this specification, I mean water soluble alkaline substances such as borax, trisodium phosphate, soda ash and the like. These are mild alkalies as compared with caustic alkalies, such as lime or caustic soda. By using a small amount of such alkali I obtain a better flowing sealer and better adhesion to various surfaces. In order to more fully disclose the broad general purpose of my said invention, I give the following examples by way of illustration.

Example 2.—88 lbs. of dry skim milk powder are placed in a suitable mixer, such as a spiral mixer commonly used in blending dry ingredients. 12 lbs. of finely ground trisodium phosphate are added, the materials mixed for about one-half hour to obtain as uniform a mixture of the dry milk and the trisodium phosphate as possible. The material is then ready to package and the procedure for dissolving same prior to applying as a sealer may be the same as described in Example 1.

Example 3.—85 lbs. of dry skim milk powder are placed in a spiral mixer. 15 lbs. of dry powdered borax is added and the mixing is carried on as described in Example 2. The product is then ready to package, and the method for dissolving is the same as described in Example 1.

Example 4.—91 lbs. of dry skim milk powder is placed in a spiral mixer. 9 lbs. of powdered sodium carbonate is added and the material mixed as described in Example 2. The resulting product is prepared for use as described in Example 1.

Example 5.—85 lbs. of dry skim milk powder are placed in a spiral mixer. 15 lbs. of diammonium phosphate in a finely ground condition is added. The material is prepared as described in Example 2. The method of dissolving the sealer is the same as described in Example 1.

I have also found it quite desirable in most cases to add various other materials to the dry milk formula for preparing this sealer. The addition of these various materials assists in not only improving the working qualities of this sealer but may also tend to give a slight roughness or tooth to the coating of sealer on the wall and this slight "tooth," which is the usual term applied to the slight roughness by painters or decorators, is of advantage when later applying coats of paint, giving better adhesion. As additional materials I may use various seed-meals, finely ground wood flour, specially prepared type of silica such as is known under the trade-name "Celite" and the like. Such materials will hereinafter be embraced in the expression "solid material acting to improve the working quantities." Examples of such combinations which I have found satisfactory are as follows:

*Example 6.*—44 lbs. of dry skim milk powder are placed in a spiral mixer. 44 lbs of very finely ground soya bean meal (approximately 200 mesh is preferred) is also added to the spiral mixer and 12 lbs. of trisodium phosphate is also added to the mixer. The material is thoroughly mixed together in the dry form for about 20 to 30 minutes to insure a uniform blend and is then ready to be packaged. The method of mixing the sealer with water for applying to surfaces is the same as described in Example 1.

*Example 7.*—44 lbs. of dry skim milk powder, 44 lbs. finely ground peanut meal, 12 lbs. trisodium phosphate. Proceed as in Example 6 and prepare for application as described in Example 1.

*Example 8.*—60 lbs. dry skim milk powder, 31 lbs. very finely ground wood flour, 9 lbs. trisodium phosphate. Mix together as described in Example 6 and the mixture prepared for sealing purposes as described in Example 1.

*Example 9.*—60 lbs. dry skim milk powder, 31 lbs. of finely divided silica, such as "Celite," 9 lbs. trisodium phosphate. The material is mixed as described in Example 6, and the finished product prepared for a sealer as described in Example 1.

It is, of course, understood that other solubilizing agents may be substituted for the trisodium phosphate and others mentioned, and that other fillers can be substituted. The proportions above indicated in the examples are satisfactory but proportions can be varied, both as regards solubilizing agents, filling materials or both.

It will also be understood that the addition of other agents for effecting special results is not precluded.

It will be understood that the sealer will be put up dry in packages, say paper bags or cardboard cartons, (which may be waterproofed if desired) and will be mixed with water, preferably by the method above described, just prior to use. The material, after mixing with water can readily be kept for a short time, say 2 to 3 days, at ordinary room temperature, but could not be kept indefinitely without spoiling.

It will be understood that I have given a particular mode of mixing the compositions containing dry milk, into water. This is a preferred method, but other methods can of course be used. Thus the powdery material can be sprinkled or sifted upon the surface of a body of cold or warm water, preferably while well agitating the water.

The solids can be mixed in a spiral mixer, as indicated in the examples, but obviously other types of mixing equipment can be used.

The material "Celite" is a commercial product consisting essentially of diatomaceous earth (siliceous casts) which is in a finely divided state, mostly passing a 175 mesh screen, or finer, mostly passing a 325 mesh screen. The material is obtainable in various degrees of fineness, and for the present invention I prefer to use the finer grades, say mostly passing a 325 mesh screen.

In some cases, a small amount of a preservative can be added to the powder (during manufacture, or later), such as 0.4 or 0.5% of sodium orthophenyl phenate, or various other preservatives. Or, if desired, a preservative can be added to the water to be mixed with the dry sealing composition.

I have found that when using my improved sealer for sealing fiber board and other rather porous surfaces that it is sometimes desirable to use a pigment or similar filling material with my sealer, such as whiting, clay, titanium white, and the like, or mixtures of same.

*Example 10.*—An example covering this feature is as follows: Into a proper mixing container place one-half gallon (approximately 4 lbs.) of cold or warm water. Then add 1 lb. of my powdered sealer, as illustrated by any of the examples, preferably 1 to 5. Mix to a smooth paste and allow to stand for a few minutes (about 15 minutes is satisfactory). Then add with stirring an additional gallon of cold or warm water, thus obtaining a mixture of approximately 12 lbs. of water to 1 lb. of the dry sealer. Then place in another receptacle 3 lbs. of ordinary commercial whiting and stir into the whiting enough of the liquid wall sealer to form a smooth heavy paste and thereafter add this heavy paste to the remainder of the dissolved wall sealer referred to above. Mix well and the pigmented sealer may then be used immediately.

The advantage of using the pigment on a wall board which is very absorbent, is very apparent. When the wall sealer is used without a pigment on such a porous board it is sucked into the board quite rapidly and while such treatment gives a decided improvement over a non-sized board, yet it requires at least one additional coat of paint to completely cover the surface, whereas, if a filling material like whiting is included, as per the example referred to above, the filling material is of great assistance in helping to close the pores of the fiber board, thus holding up subsequent coats of paint.

My experiments have shown the filler or pigment to be highly effective for preventing undue absorption of the paints, even on the highly porous wall boards such as that known on the market as "Masonite."

I claim:

1. A wall sealing composition characterized by containing as a substantial constituent, dried milk, which material when well mixed with water, is a liquid composition suitable for application to walls.

2. A wall sealing composition which comprises dried milk and an alkaline solubilizing agent.

3. A wall sealing composition which comprises dried milk and a minor fraction only of its weight of an alkaline solubilizing agent.

4. A wall sealing composition which comprises dried milk, a finely pulverulent seedmeal, and an alkaline solubilizing agent.

5. A wall sealing composition containing about one part of a solid material which contains a large proportion of dried milk mixed with about a dozen parts of water.

6. A wall sealing composition containing about one part dried milk mixed with about a dozen parts of water.

7. A wall sealing composition containing about one part of a finely pulverulent solid material which contains a large proportion of dried milk mixed with about a dozen parts of water and an amount of a mild alkali corresponding to about 9 to 15% of the amount of the dried milk.

8. A wall sealing composition base which comprises a quantity of dried milk and at least about half that quantity of a solid material acting to improve the working qualities, all well mixed with a mild solid alkali in the proportion of about 12–15% of the dried milk, and which base, upon being well mixed with about a dozen times its weight of water will give a wall sealing liquid composition.

9. A wall sealer base which contains, in a finely pulverulent state, dried skim milk as a substantial constituent, mixed with a mild solid alkali in an amount equal to about 12–15% of the dried milk, one part of which base can be mixed with about a dozen parts of water, to give a substantially homogeneous wall sealing liquid composition.

10. A process of dissolving a wall sealing material containing dried milk, as a large component, which comprises mixing the said material with enough water to form a smooth paste, allowing to stand for a fraction of an hour, and adding an amount of water greater than that used in the first mixing step.

11. A process of dissolving a wall sealing material containing dried milk, as a large component, together with an alkaline solubilizing agent, which comprises mixing the said material with enough water to form a smooth paste, allowing to stand for a minor fraction of an hour, and adding an amount of water greater than that used in the first mixing step.

12. A process of sealing a wall which comprises applying thereto an aqueous substantially homogeneous liquid containing dried milk, and allowing the same to dry.

13. In sealing a wall, the step of applying to said wall, dried milk, mixed with an aqueous liquid, as a wall sealing composition.

WILLIAM F. LEICESTER.